United States Patent [19]
Kaganoi et al.

[11] Patent Number: 6,026,450
[45] Date of Patent: Feb. 15, 2000

[54] DATA TRANSFER CONTROL SYSTEM WHICH USES FIELDS OF A TABLE TO CONTROL THE DATA TRANSFER

[75] Inventors: Teruo Kaganoi; Akio Harasawa, both of Tokyo, Japan

[73] Assignee: NEC Corporation, Tokyo, Japan

[21] Appl. No.: 08/917,723

[22] Filed: Aug. 27, 1997

[30] Foreign Application Priority Data

Aug. 27, 1996 [JP] Japan ...................................... 8-225470

[51] Int. Cl.⁷ ..................................................... G06F 13/14
[52] U.S. Cl. .............................. 710/33; 370/382; 711/165
[58] Field of Search ..................................... 711/206, 207, 711/208, 109, 110, 147, 165; 710/22, 26, 27, 31, 33, 34, 35; 395/311, 312; 370/381, 382, 383

[56] References Cited

U.S. PATENT DOCUMENTS

| | | | |
|---|---|---|---|
| 5,425,023 | 6/1995 | Haraguchi et al. | 370/400 |
| 5,623,624 | 4/1997 | Holland et al. | 711/105 |
| 5,640,528 | 6/1997 | Harney et al. | 711/206 |
| 5,644,787 | 7/1997 | Nakamura et al. | 710/33 |
| 5,659,798 | 8/1997 | Blumrich et al. | 710/26 |
| 5,765,022 | 6/1998 | Kaiser et al. | 710/22 |
| 5,859,990 | 1/1999 | Yarch | 395/311 |

FOREIGN PATENT DOCUMENTS

| | | |
|---|---|---|
| 62-279449 | 12/1987 | Japan . |
| 4-263343 | 9/1992 | Japan . |

*Primary Examiner*—Eddie P. Chan
*Assistant Examiner*—Gary J. Portka
*Attorney, Agent, or Firm*—Sughrue, Mion, Zinn, Macpeak & Seas, PLLC

[57] ABSTRACT

A transfer control table contains a source memory designation field, a desired region designation field, a shifting amount designation field, and a destination memory designation field. An source selection circuit selects source designation word data from the source word data stored in the source memory according to source memory designation data contained in the source memory designation field to provide the source designation word data. A transfer data bit operation circuit extracts, in response to the source designation word data, only the word data required for transfer as valid word data according to desired region designation data contained in the desired region designation field to shift the valid word data by a bit width that is predetermined based on shifting amount designation data contained in the shifting amount designation field and then to provide the shifted valid word data. A destination selection circuit selects which designation region in the destination memory the shifted valid word data are to be stored in and then provides the shifted valid word data to the designated area in the destination memory.

15 Claims, 7 Drawing Sheets

DATA TRANSFER CONTROL SYSTEM WHICH USES FIELDS OF A TABLE TO CONTROL THE DATA TRANSFER

BACKGROUND OF THE INVENTION

The present invention relates to a data transfer system for controlling data transfer from one memory to another. More particularly, the present invention relates to a data transfer control system that extracts a specific field rapidly out of transferred word data.

For the transfer of data from one memory (hereinafter, referred to as a source memory) which the data to be transferred are stored on to another memory (hereinafter, referred to as a destination memory), a processor accesses to the source memory. The source memory stores the data by each page having a predetermined structure as a unit. The processor directs a page address register which page in the source memory should be accessed. A synchronous data transfer controller comprises an address generation circuit. A time-source-destination table (hereinafter, abbreviated as TSDT) has a time designation field, a source designation field, and a destination designation field. The address generation circuit designates an address in the source memory according to the source designation field and page designation information stored in the page address register. The data taken out of the source memory are transferred as transferred data to an output port designated by the destination designation field. The transferred data are sent to a pre-fetching register. Word data in a page on the source memory are consecutively transferred according to the fields defined in TSDT.

Conventional data transfer control systems extract a desired portion of the data by masking an unnecessary portion of the same data after the transfer of the data from the source memory to the destination memory. More specifically, TSDT of the conventional data transfer control systems is directed to designate only an address in the source memory and a storage region in the destination memory in which the transferred data are stored. This means that the whole word data at a designated address in the source memory is transferred to the destination memory, which makes it necessary to carry out shift operation or mask operation of the transferred data after completion of transfer in order to extract a desired field out of the transferred data.

The above-mentioned conventional technique designates the address where the data to be transferred are stored in the source memory, but not the portion of the data to be transferred. Thus the whole word data are transferred to the destination memory. For this reason, the destination memory should have the same bit width as the source memory. The designation memory of such structure cannot be reduced in size.

SUMMARY OF THE INVENTION

An object of the present invention is to decrease the load for data transfer operation, especially the load required for data handling, on a processor in an information processing device Another object of the present invention is to reduce the scale of a data transfer control circuit.

A data transfer control system according to a first aspect of the present invention comprises a source memory which source word data are stored on; a transfer control table having a source memory designation field, a desired region designation field, a shifting amount designation field, and a destination memory designation field; a source selection circuit which selects source designation word data from the source word data according to source memory designation data contained in the source memory designation field to provide the source designation word data; a transfer data bit operation circuit that extracts, in response to the source designation word data, the word data required for transfer as valid word data according to desired region designation data contained in the desired region designation field to shift the valid word data by a bit width that is predetermined based on shifting amount designation data contained in the shifting amount designation field and then to provide shifted valid word data; a destination selection circuit for selecting which designated region in the destination memory the shifted valid word data is to be stored in and then providing the shifted valid word data; and a destination memory which stores the shifted valid word data in the designated region.

A data transfer control system according to a second aspect of the present invention comprises a source memory which source word data are stored on; a transfer control table having a source memory designation field and a desired region designation field; a source selection circuit which selects source designation word data from the source word data according to source memory designation data contained in the source memory designation field to provide the source designation word data; a transfer data bit operation circuit that extracts, in response to the source designation word data, only the word data required for transfer as valid word data according to desired region designation data contained in the desired region designation field to automatically shift the valid word data such that the least significant bit of the valid word data is the least significant bit of the whole source designation word data and then to provide shifted valid word data; a destination selection circuit that automatically supplies, by means of previously making unconditional correspondence between a line number of the transfer control table and a storing destination where the shifted valid word data are stored, the shifted valid word data to the storing destination; and a destination memory which stores the shifted valid word data in the designated region.

DESCRIPTION OF THE PREFERRED EMBODIMENTS

Figure 1:
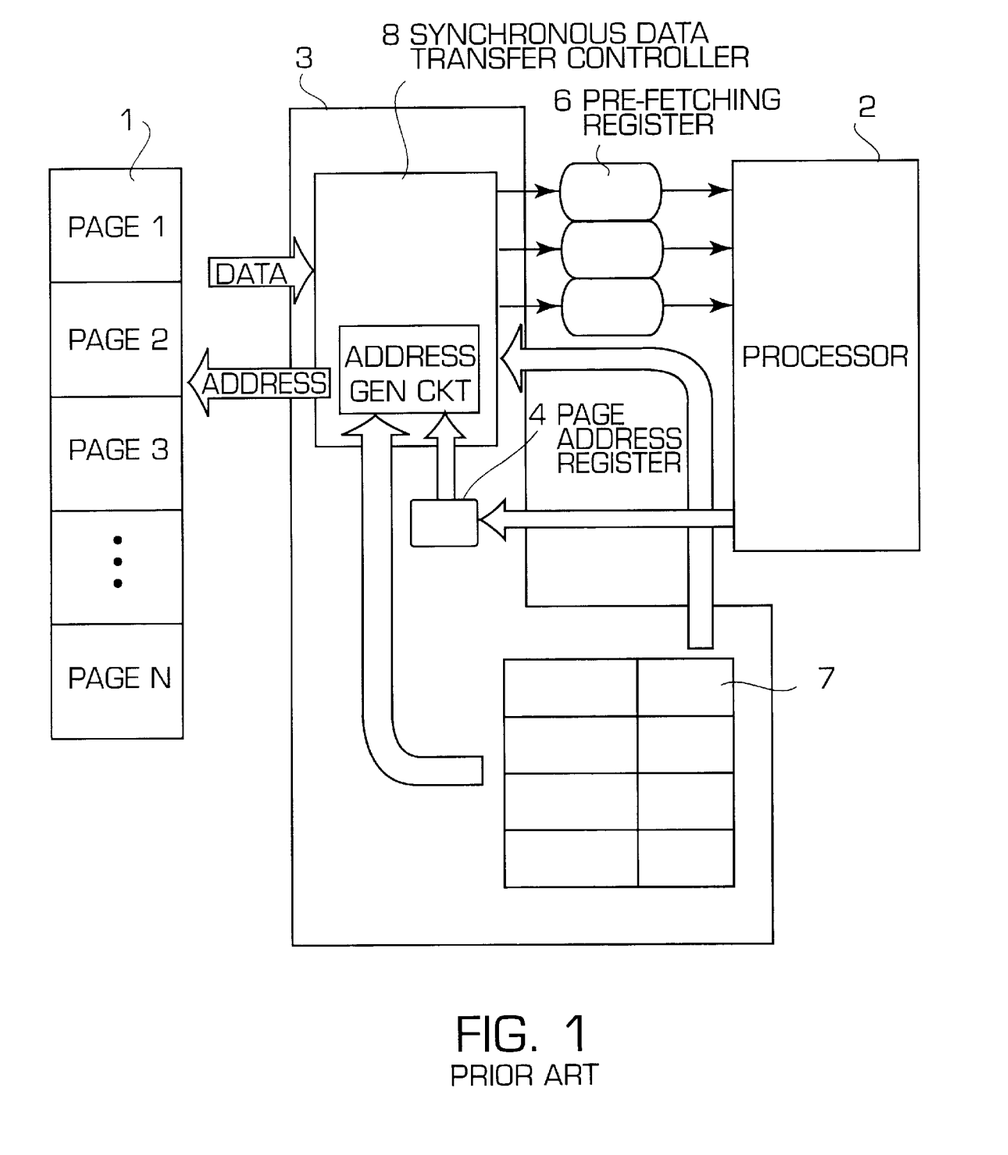
FIG. 1 is a block diagram showing the structure of a conventional data transfer control system.

A conventional data transmitting/receiving device is described with reference to FIG. 1 for the purpose of facilitating the understanding of the present invention. In FIG. 1, a memory 1 stores data by each page having a predetermined structure as a unit. When accessing to the memory 1, a processor 2 designates a page address register 4 which page in the memory 1 is to be accessed. A synchronous data transfer controller 8 comprises an address generation circuit 9. A time-source-destination table (TSDT) 7 has a time designation field, a source designation field, and a destination designation field. The address generation circuit 9 designates an address in the memory 1 according to the source designation field and page designation information stored in the page address register 4. The data taken out of the memory 1 are transferred as transferred data to an output port designated by the destination designation field. The transferred data are set to a pre-fetching register 6. The word data In a page on the memory 1 are consecutively transferred according to the fields defined in TSDT 7.

The TSDT 7 of the conventional data transfer control system is directed to designate only an address in a source memory, namely, the memory 1, and an output port. This means that the whole word data at a designated address in the source memory is transferred to a destination memory, which makes It necessary to carry out a shift operation or mask operation of the transferred data after completion of transfer in order to extract a desired field out of the transferred data. In addition, the destination memory should have the same bit width as the source memory because the whole word data are transferred to the destination memory. The designation memory of such structure cannot be reduced in size.

Figure 2:
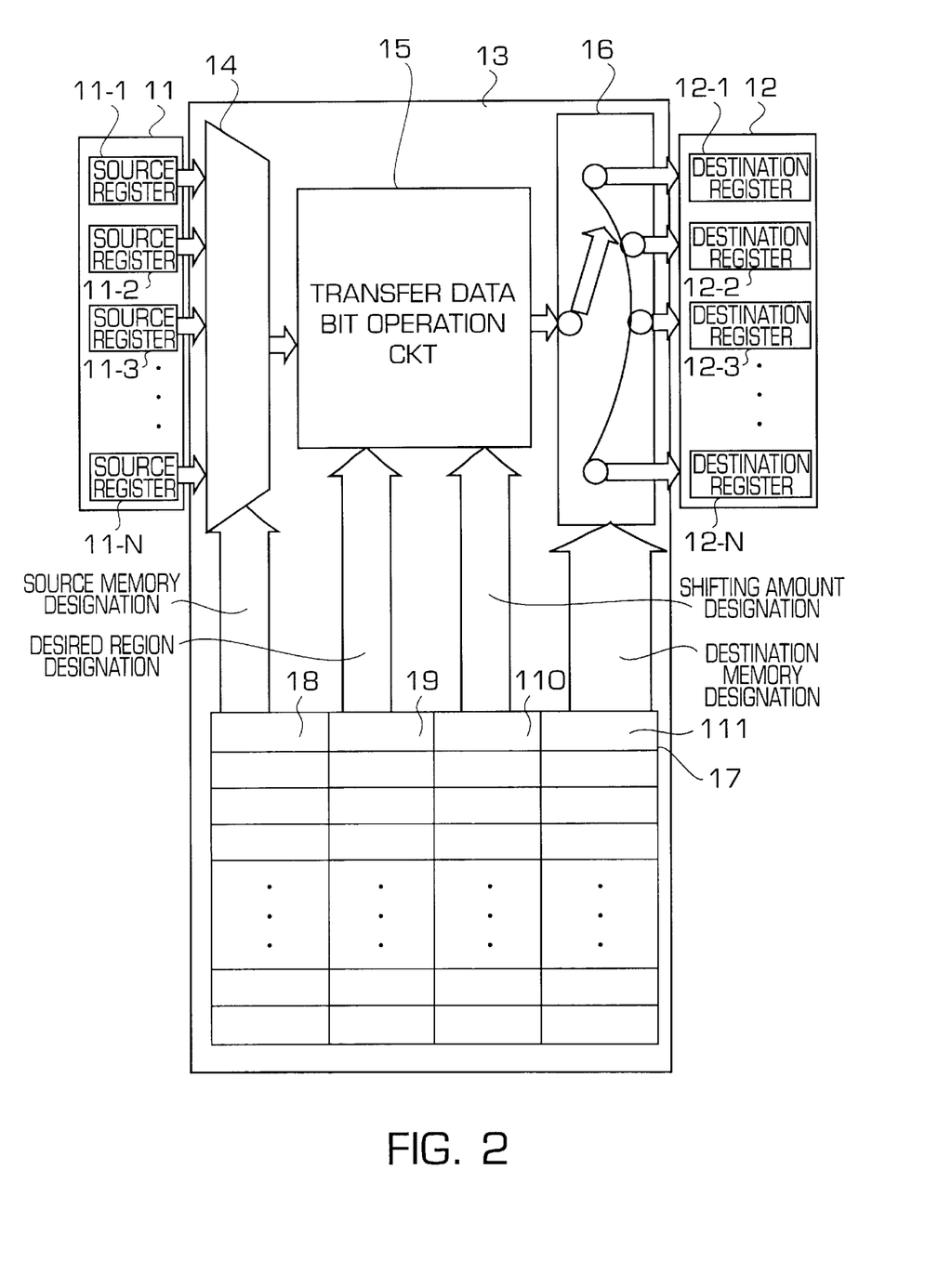
FIG. 2 is a block diagram showing the structure of a data transfer control system according to a first embodiment of the present invention.

A data transfer control system according to a first embodiment of the present invention is described in detail with reference to FIG. 2. As shown in FIG. 2, the data transfer control system of the first embodiment comprises a source register group 11, a destination register group 12, and a data transfer control circuit 13. The source register group 11 has N number of source registers 11-1 through 11-N (where N is a natural number equal to or larger than 2) and serves as a source memory. The destination register group 12 has J number of destination registers 12-1 through 12-J (where J is a natural number equal to or larger than 2) and serves as a destination memory. The data transfer control circuit 13 is connected between the source register group 11 and the destination register group 12. In addition, the data transfer control circuit 13 comprises a source selection circuit 14, a transfer data bit operation circuit 15, a destination selection circuit 16, and a transfer control table 17.

The transfer control table 17 comprises a source region, a transfer data bit operation information region, and a destination region. The source region is contained in the transfer control table 17 as a source memory designation field 18. The source memory designation field 18 has source memory designation data to designate one of the source registers in the source register group 11. More specifically, the source memory designation field 18 has switching control data that are used to select an output of one source register. The transfer data bit operation information region is contained in the transfer control table 17 as a desired region designation field 19 and a shifting amount designation field 110. The desired region designation field 19 has desired region designation data. The desired region designation data are for extracting a desired data region as valid word data out of source designation word data supplied from the source selection circuit 14 according to the source memory designation data. The desired region designation data are also for designating at which bit position the valid word data are to be placed. More specifically, the desired region designation field 19 has a pattern indicating which bit is valid and which bit is not of the source designation word data supplied in accordance with the source memory designation data. This is for the subsequent masking described below. The shifting amount designation field 110 has shifting amount designation data. The shifting amount designation data are formed of shift direction designation data and shift bit width designation data. The shift direction designation data are for designating a direction in which the valid word data are to be shifted. The shift bit width designation data are for designating a bit width by which amount the valid word data are shifted. This is for transferring shifted valid word data to the destination register as described below. The destination region is contained in the transfer control field 17 as a destination memory designation field 111. The destination memory designation field 111 has destination memory designation data. The destination memory designation data are for designating which destination register in the destination register group 12 the shifted valid word data are to be transferred to. More specifically, the destination memory designation field 111 has switching control data for use in choosing one destination register.

The desired region designation field 19 has the same bit width as the Individual source registers 11-1 through 11-N. The source memory designation field 18 contains information indicative of an address at which data are stored of which validity is indicated by the desired region designation field 19. The desired region designation field 19 is used as a flag of one bit to indicate validity of the data at the address contained in the source memory designation field 18. The desired region designation field 19 may be a flag of a nibble (four bits) or of a byte to indicate the validity of the data. The source designation word data may be indicated as valid or invalid by a bit string having a certain width of, for example, a nibble or a byte.

The source registers 11-1 through 11-N of the source register group 11 store source word data. The source selection circuit 14 takes all source word data stored in the source register group 11. The source selection circuit 14 selects as source designation word data stored in either one of the source registers from all source word data. The source selection circuit 14 then supplies the source designation word data to the transfer data bit operation circuit 15. In other words, the source selection circuit 14 serves as a selector circuit.

The transfer data bit operation circuit 15 has masking function and bit shifting function. More specifically, the transfer data bit operation circuit 15 extracts, as the valid word data, the source designation word data designated by the desired region designation data. The transfer data bit operation circuit 15 then shifts the valid word data by a predetermined bit width determined according to the shifting amount designation data. The transfer data bit operation circuit 15 supplies the shifted valid word data to the destination selection circuit 16. The destination selection circuit 16 selects one destination register that is designated according to the destination memory designation data. The destination selection circuit 16 then supplies the shifted valid word data to the selected destination register. In other words, the destination selection circuit 16 serves as a selector circuit.

The shifted valid word data are stored through the data transfer control circuit 13 in the destination register, namely, one of the destination registers 12-1 through 12-J of the destination register group 12, that is designated according to the destination memory designation data.

Next, operation of the aforementioned first embodiment is described in detail with reference to FIG. 2. The source selection circuit 14 takes all source word data that are stored in the source register group 11. The source selection circuit 14 reads out of the transfer control table 17 the source memory designation data contained in the source memory designation field 18 in a first row of the transfer control table 17. Next, the source selection circuit 14 reads the source word data as the source designation word data out of either one of the source registers according to the source memory designation data. The source selection circuit 14 then supplies the source designation word data to the transfer data bit operation circuit 15.

A valid bit or bits are extracted from the source designation word data according to the desired region designation data read out by the transfer data bit operation circuit 15. Remaining invalid bits are masked. When the masking is carried out with a positive logic, a valid bit or bits in the desired region designation field 19 are set to "1". The desired region designation field 19 with the valid bit(s) set to "1" is then ANDed with the source designation word data supplied from the source selection circuit 14. Invalid bits are masked to "0". When the masking is carried out with an negative logic, a valid bit or bits in the desired region designation field 19 are set to "0". The desired region designation field 19 with the valid bit(s) set to "0" is then ORed with the source designation word data supplied from the source selection circuit 14. Invalid bits are masked to "1".

Subsequently, the transfer data bit operation circuit 15 shifts the valid word data obtained in the above-mentioned manner according to the shifting amount designation data. The shifting operation is carried out by means of shifting the valid word data by a bit width designated by the shift bit width designation data in the direction designated by the shift direction designation data (i.e., rightward or leftward). The shifted valid word data are then supplied to the destination selection circuit 16. The shifted valid word data are not necessarily the same in bit width as the received word data. Designation of the shifting direction by the shifting amount designation field is not required when the shifting is carried out in the same direction.

The destination selection circuit 16 determines, according to the destination memory designation data, to which destination register of the destination register group 12 the shifted valid word data are transferred. The destination selection circuit 16 transfers the shifted valid word data to the destination register determined. More specifically, the destination selection circuit 16 extracts the bit string corresponding to the destination memory designation data from the transfer control table 17. Subsequently, the destination selection circuit 16 generates a switching control signal for use in selecting the register on which the shifted valid word data are to be written, out of the destination register group 12 according to the destination memory designation data. The destination selection circuit 16 then transfers the shifted valid word data to the destination register selected. The above procedures are repeated when two or more pieces of transfer control information are defined in the transfer control table 17.

Figure 3:
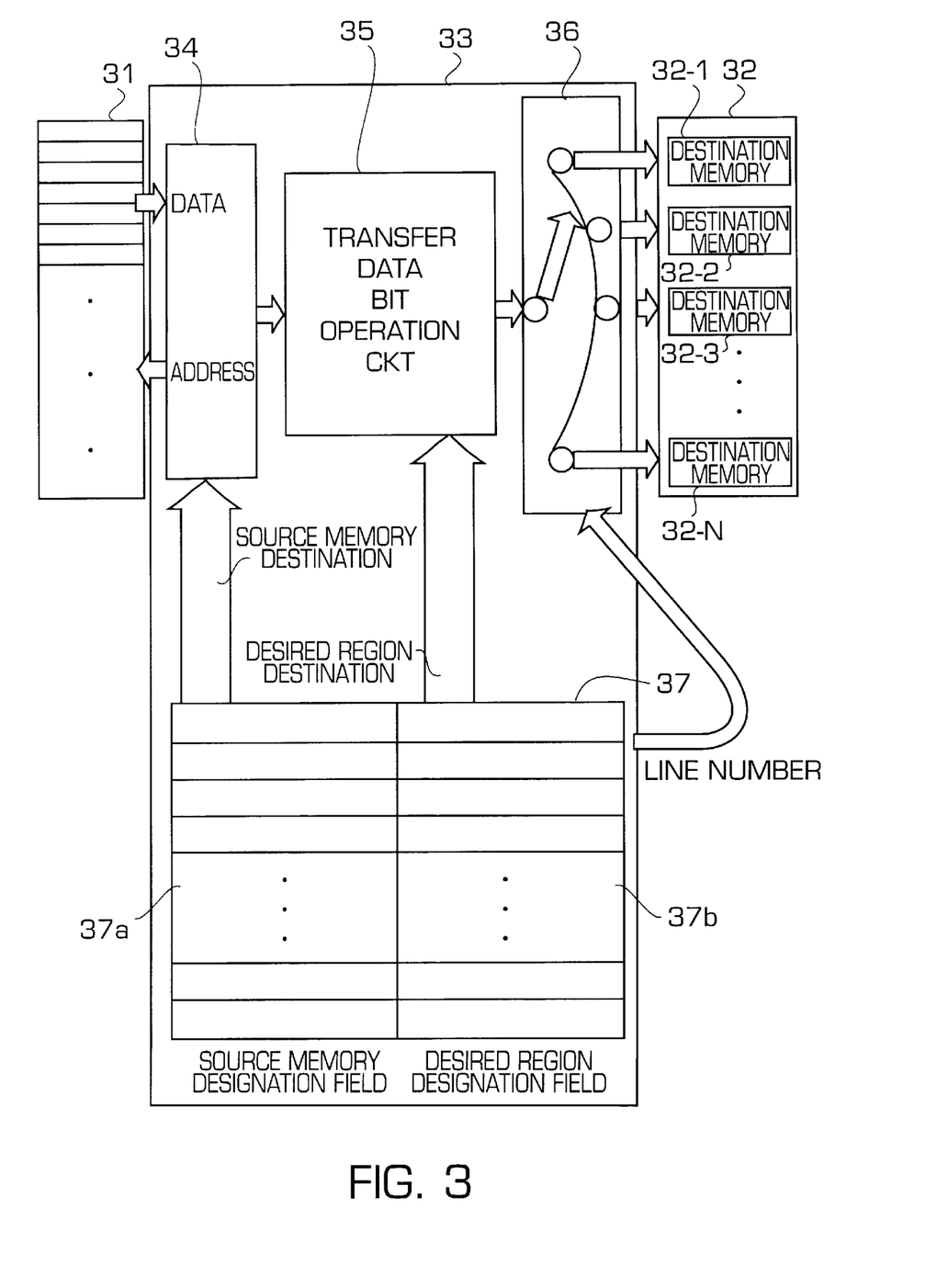
FIG. 3 is a block diagram showing the structure of a data transfer control system according to a second embodiment of the present invention.

Next, a second embodiment of the present invention is described with reference to FIG. 3. In FIG. 3, a data transfer control system according to the second embodiment comprises an addressable source memory 31, a destination register group 32, and a data transfer control circuit 33. The destination register group 32 has J number of destination registers 32-1 through 32-J (where J is a natural number equal to or larger than 2). The data transfer control circuit 33 is connected between the source memory 31 and the destination register group 32. The data transfer control circuit 33 comprises a source selection circuit 34, a transfer data bit operation circuit 35, a destination selection circuit 36, and a transfer control table 37.

The transfer control table 37 has a source region and a transfer data bit operation information region. The source region is contained in the transfer control table 37 as a source memory designation field 37*a*. The source memory designation field 37*a* contains information indicative of a source address in the source memory 31. The source data bit operation information region is contained in the transfer control table 37 as a desired region designation field 37*b*. The desired region designation field 37*b* has desired region designation data. The desired region designation data are for extracting a desired data region as valid word data out of the source designation word data read from the source memory 31 and supplied through the source selection circuit 34. The desired region designation data are also for designating at which bit position the extracted valid word data are to be placed. In other words, the desired region designation field 37*b* has a pattern indicating which bit is valid and which bit is not of the source designation word data supplied in accordance with the source memory designation data.

The source memory 31 stores the source word data. The source selection circuit 34 selects and takes the source designation word data based on the source address from the source word data stored in the source memory 31. The source selection circuit 34 supplies the source designation word data to the transfer data bit operation circuit 35. That is, the source selection circuit 34 serves as a memory access circuit.

The transfer data bit operation circuit 35 may be, for example, a cross-point switch. The transfer data bit operation circuit 35 conducts masking on the source designation word data according to the desired region designation data in the transfer control table 37. The data transfer control system of this embodiment has no shifting amount designation field. Instead, the transfer data bit operation circuit 35 is defined to shift the valid word data such that the least significant bit of the bit string having a flag indicative of "valid" in the desired region designation field is unconditionally the least significant bit of the whole valid word data. The data transfer control system has no destination memory designation field, too. Instead, the transfer data bit operation circuit 35 makes correspondence between the line number of the transfer control table 37 and respective output port numbers for the destination register group 32. As described above, the shifted valid word data that are automatically shifted are then supplied to the destination selection circuit 36.

The destination selection circuit 36 has output ports the number of which is equal to the number of the destination registers in the destination register group 32. The destination selection circuit 36 monitors the line number in the transfer control table 37 currently active to determine an output port number corresponding to the line number.

Next, operation of the aforementioned second embodiment of the present invention is described in detail with reference to FIG. 3. The source selection circuit 34 has an address register for the source memory 31. The source selection circuit 34 looks up the address indicated by the source memory designation data in the transfer control table 37 to read the source designation word data at the corresponding address out of the source memory 31. The source selection circuit 34 then supplies the source designation word data to the transfer data bit operation circuit 35.

The transfer data bit operation circuit 35 has the cross-point switch or a selector. The transfer data bit operation circuit 35 masks the bits indicated as invalid of the source designation word data according to the desired region designation data to extract the valid word data. The transfer data bit operation circuit 35 automatically shifts the valid word data such that the least significant bit of the desired region designation data that indicates valid is the least significant bit of the source designation word data. The transfer data bit operation circuit 35 supplies the shifted valid word data to the destination selection circuit 36.

The destination selection circuit 36 looks up the line number of the transfer control table 37 currently active to transfer the shifted valid word data to the output port having the number equal to the line number. Thus the shifted valid word data are stored in the destination register of the destination register group 32 that has the port number same as the line number.

According to the present invention, it is possible to extract only a necessary portion of data for the destination memory through the data transfer control system of the present invention when packet data having a regular data structure or data having a flame structure is processed. This allows reduction in memory capacity as well as the number and size of the registers at the destination.

When at least one of the source memory and the destination memory is a register group, fast access can be provided while increasing the subsequent processing capacity because desired data are automatically set to the register by the processor. Furthermore, the transfer control table is highly independent of the program itself. Either one can be modified easily, if necessary.

According to the second embodiment, the shifting amount designation field and the destination memory designation field may be omitted in the transfer control table, reducing the size of the transfer control table. As a result, the data transfer control system described above is suitable for a processing regular operation such as a processing for communication.

Figure 4:
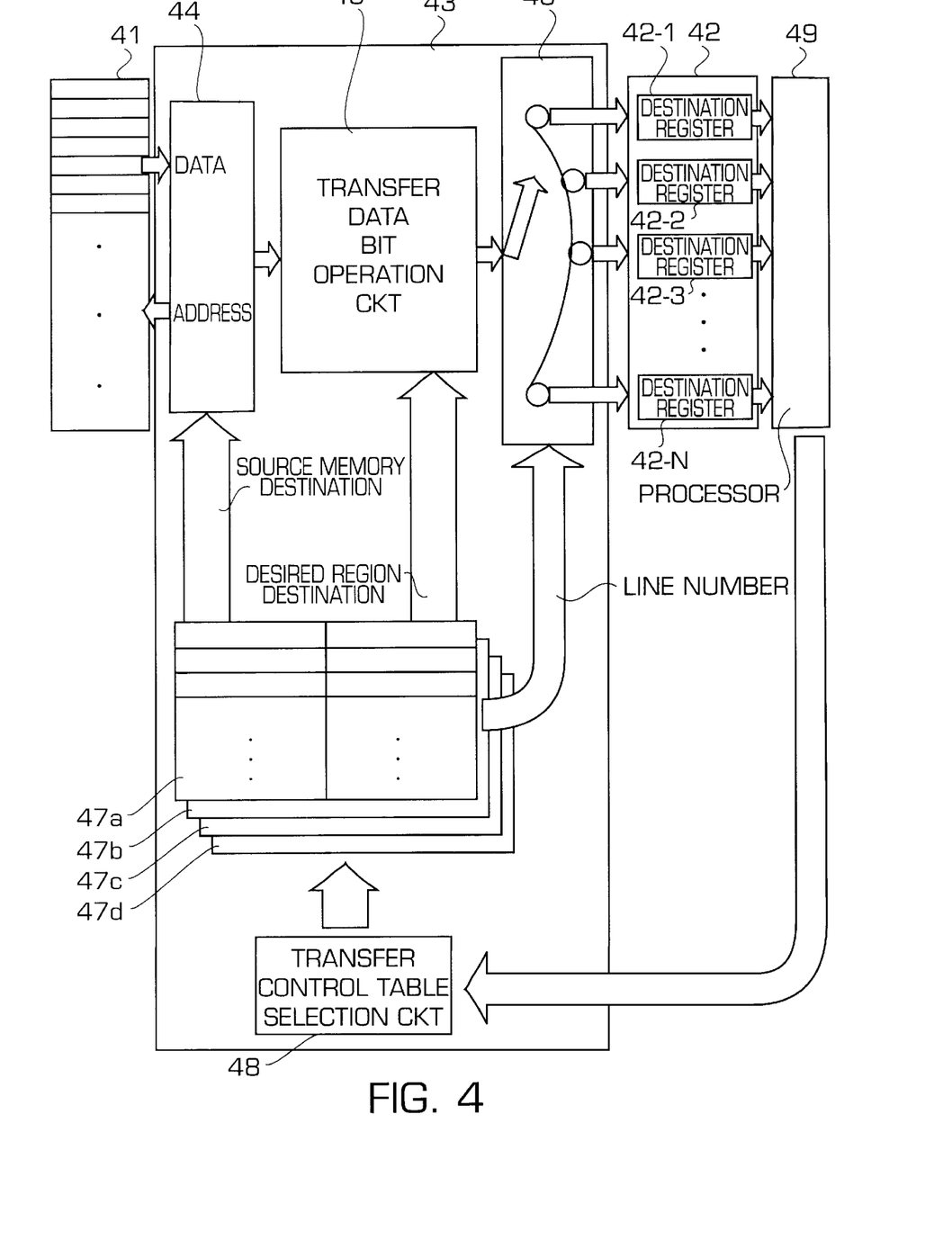
FIG. 4 is a block diagram showing the structure of a data transfer control system according to a third embodiment of the present invention.

A third embodiment of the present invention is described in detail with reference to FIG. 4. As shown in FIG. 4, the data transfer control system according to the third embodiment comprises a source memory 41, a source register group 42, and a data transfer control circuit 43. The source register group 42 has J number of source registers 42-1 through 42-J (where J is a natural number equal to or larger than 2). The data transfer control circuit 43 is connected between the source memory 41 and the source register group 42. The data transfer control circuit 43 comprises a source selection circuit 44, a transfer data bit operation circuit 45, a destination selection circuit 46, a transfer control table group 47, and a transfer control table selection circuit 48.

The destination registers 42-1 through 42-J are connected to a source operand bus of a processor 49. The source memory 41, the destination register group 42, the source selection circuit 44, the transfer data bit operation circuit 45, and the destination selection circuit 46 are similar to those described above in conjunction with the second embodiment. The transfer control table group 47 is formed of a logical or physical combination of two or more transfer control tables used in the second embodiment. The transfer control table group 47 herein comprises four transfer control tables 47a, 47b, 47c, and 47d. Each transfer control table in the transfer control table group 47 has the same field structure as the one described above in the second embodiment.

In response to transfer control table designation information supplied from the processor 49, the transfer control table selection circuit 48 determines the transfer control table that is required for the subsequent data transfer.

Next, operation of the third embodiment of the present invention is described with reference to FIG. 4. The third embodiment of the present invention is similar to the second embodiment except for the transfer control table group 47 and the transfer control table selection circuit 48. Therefore, no repetitive description is made about the components other than the transfer control table group 47 and the transfer control table selection circuit 48.

First, the processor 49 supplies a transfer control table selection signal to the transfer control table selection circuit 48. The transfer control table selection signal is for selecting the transfer control table that is required subsequently from the transfer control table group 47. The transfer control table selection circuit 48 selects the corresponding transfer control table in response to the transfer control table selection signal. The subsequent procedures are similar to those described above.

Figure 5:
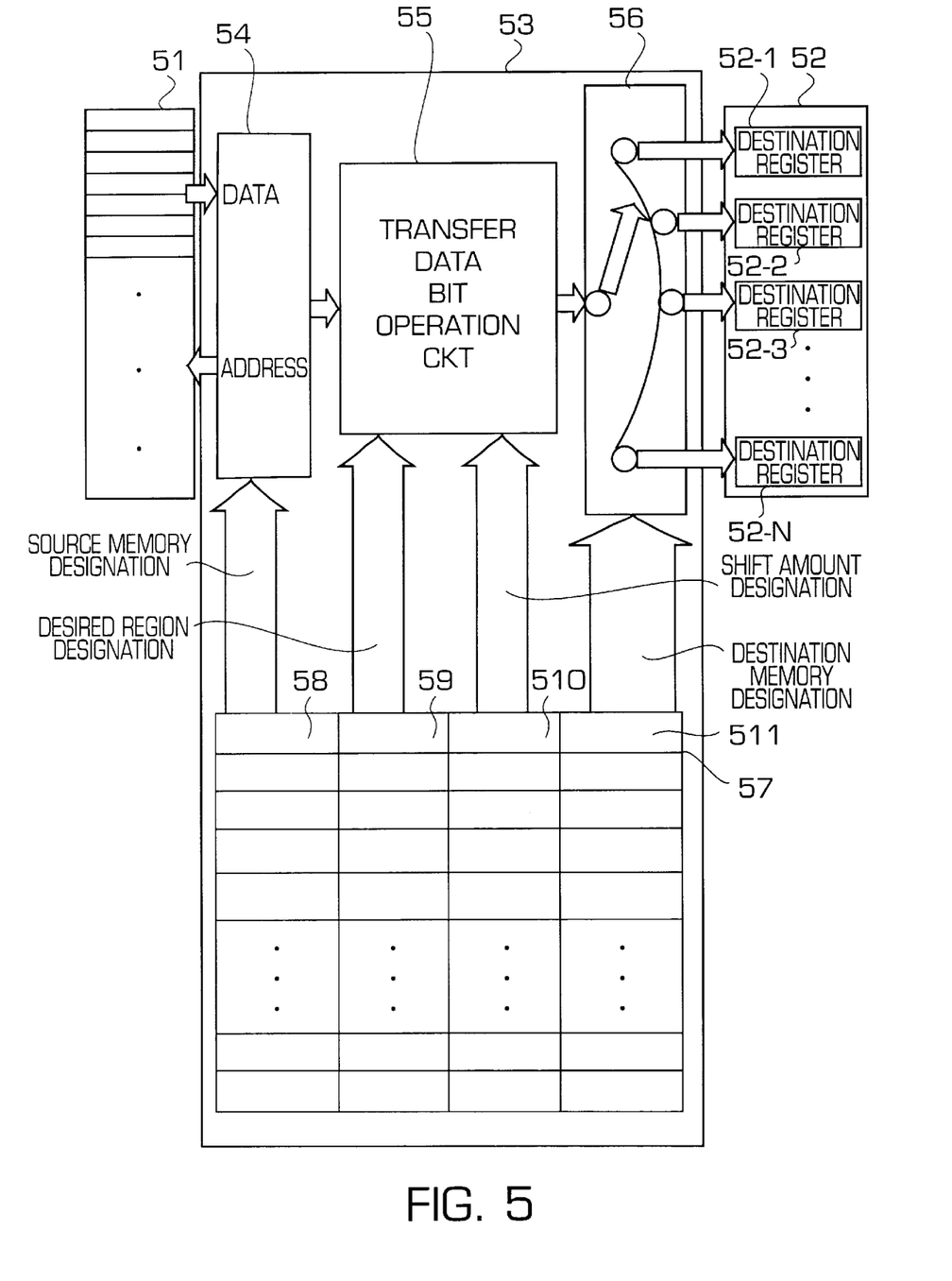
FIG. 5 is a block diagram showing the structure of a data transfer control system according to a fourth embodiment of the present invention.

Next, a fourth embodiment of the present invention is described in detail with reference to FIG. 5. The fourth embodiment of the present invention is similar to the first embodiment described above except that the source register group 11 and the source selection circuit 14 as the selector circuit are replaced by a source memory 51 and a source selection circuit 54 that serves as a memory access circuit, respectively.

Therefore, no repetitive description is made about the components other than the source memory 51 and the source selection circuit 54.

A transfer control table 57 has a source region, a transfer data bit operation information region, and a destination region. The source region is contained in the transfer control table 57 as a source memory designation field 58. The source memory designation field 58 contains information indicative of a source address in the source memory 51. The source data bit operation information region is contained in the transfer control table 57 as a desired region designation field 59 and a shifting amount designation field 510. The desired region designation field 59 has desired region designation data. The desired region designation data are for extracting a desired data region as valid word data out of source designation word data supplied from the source selection circuit 54 according to the source memory designation data. In other words, the desired region designation field 59 has a pattern indicating which bit is valid and which bit is invalid. The shifting amount designation field 510 has shifting amount designation data. The shifting amount designation data are formed of shift direction designation data and shift bit width designation data. The shift direction designation data are for designating a direction in which the valid word data are to be shifted. The shift bit width designation data are for designating a bit width by which amount the valid word data are shifted.

The destination region is contained in the transfer control field 57 as a destination memory designation field 511. The destination memory designation field 511 has destination memory designation data. The destination memory designation data are for designating which designation register in the designation register group 52 the shifted valid word data are to be transferred to. More specifically, the destination memory designation field 511 has switching control data for use in choosing one destination register.

The source memory 51 stores the source word data. The source selection circuit 54 selects and takes the source designation word data based on the source address from the all source word data. The source selection circuit 54 supplies the source designation word data to the transfer data bit operation circuit 55. That is, the source selection circuit 54 serves as a memory access circuit.

Next, operation of the source memory 51 and the source selection circuit 54 is described in detail with reference to FIG. 5. The source selection circuit 54 has an address register for the source memory 51. The source selection circuit 54 looks up the address indicated by the source memory designation data in the transfer control table 57 to read the source designation word data at the corresponding address out of the source memory 51. The source selection circuit 54 then supplies the source designation word data to the transfer data bit operation circuit 55. The subsequent procedures are similar to those described in conjunction with the first embodiment.

Figure 6:
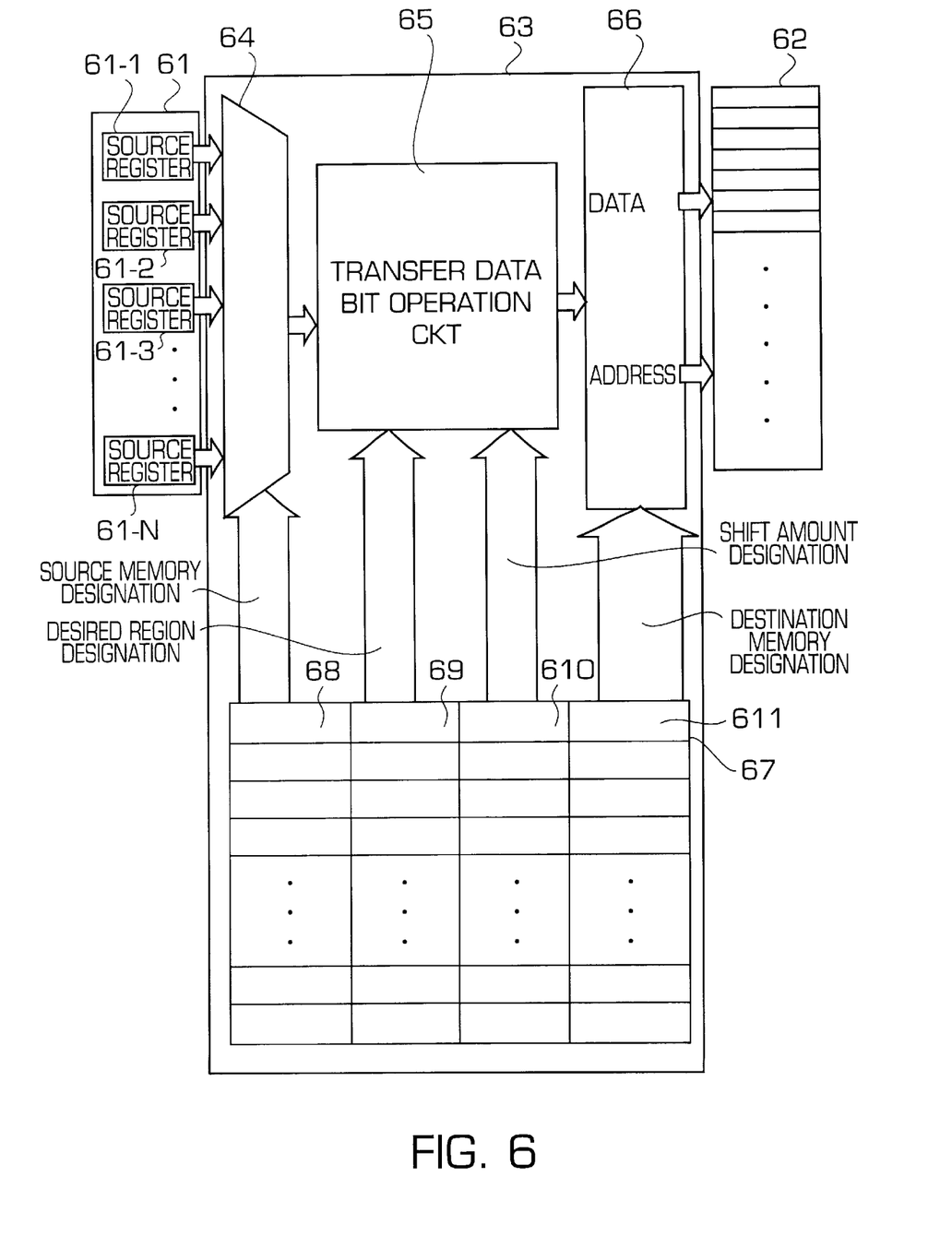
FIG. 6 is a block diagram showing the structure of a data transfer control system according to a fifth embodiment of the present invention.

A fifth embodiment of the present invention is described with reference to FIG. 6. The fifth embodiment of the present invention is similar to the first embodiment except that the destination register group 12 and the destination selection circuit 16 that serves as the selector circuit are replaced by a destination memory 62 and a destination selection circuit 66 that serves as a memory access circuit, respectively. Therefore, no repetitive description is made about the component other than the destination memory 62 and the destination selection circuit 66.

The transfer control table 67 has a source region, a transfer data bit operation information region, and a destination region. The source region is contained in the transfer control table 67 as a source memory designation field 68. The source memory designation field 68 has source memory designation data to designate one of the source registers in the source register group 61. More specifically, the source memory designation field 68 has switching control data that are used to select one source register. The source data bit operation information region is contained in the transfer control table 67 as a desired region designation field 69 and a shifting amount designation field 610. The desired region designation field 69 has desired region designation data. The desired region designation data are for extracting a desired data region as valid word data out of source designation word data supplied from the source selection circuit 64 according to the source memory designation data. The desired region designation data is also for designating at which bit position the valid word data are to be placed. In other words, the desired region designation field 69 has a pattern indicating which bit is valid and which bit is invalid of the source designation word data supplied according to the source memory designation data. This is for the subsequent masking described below. The shifting amount designation field 610 has shifting amount designation data. The shifting amount designation data are formed of shift direction designation data and shift bit width designation data. The shift direction designation data are for designating a direction in which the valid word data are to be shifted. The shift bit width designation data are for designating a bit width by which amount the valid word data are shifted.

The destination region is contained in the transfer control field 67 as a destination memory designation field 611. The destination memory designation field 611 contains information indicative of a destination address in the destination memory 62. The destination selection circuit 66 supplies the shifted valid word data to a storage area in the destination memory 62 according to the destination address.

Next, operation of the destination memory 62 and the destination selection circuit 66 is described with reference to FIG. 6. The destination selection circuit 66 has an address register for the destination memory 62. The destination selection circuit 66 generates a write address for the destination memory 62. The destination selection circuit 66 looks up the write address represented by the destination memory designation data to supply the shifted valid word data to the corresponding address region in the destination memory 62. The above procedures are repeated when two or more pieces of transfer control information are defined in the transfer control table 67. Operations before that are similar to those described in the first embodiment.

According to the present invention, the masking and the shifting are performed automatically upon transferring the data. Thus only the valid data are transferred to the destination memory out of the data stored in the source memory. Therefore, the processor can eliminate the masking and the shifting operations after transferring of the data. This decreases the load of data handling on the processor itself, improving the operation capability of the processor.

In addition, according to the present invention, only the valid word data are transferred to the destination memory out of the data stored in the source memory. Therefore, it is possible to provide a destination memory having the shorter bit width than that of the source memory. The data transferred to the destination memory can be minimized to reduce the capacity of the destination memory and to miniaturize the circuit.

Furthermore, according to the present Invention, the desired region designation data may be represented by a bit string having a certain width, rather than by one bit, for the transfer control table. This makes it possible to reduce the scale of the transfer control table and the transfer data bit operation circuit though it involves some sacrifice of flexibility in determining validity.

Figure 7:
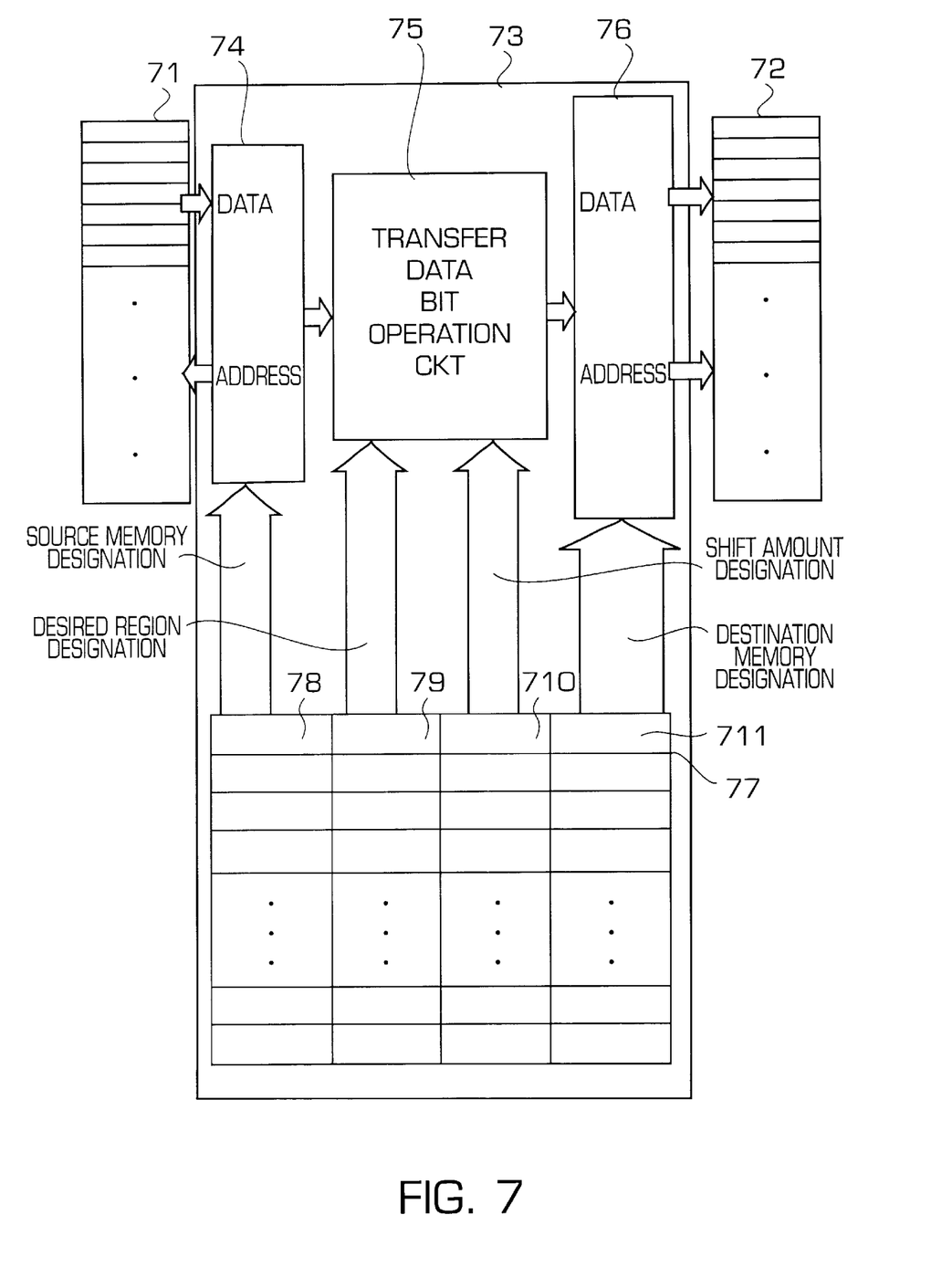
FIG. 7 is a block diagram showing the structure of a data transfer control system according to a sixth embodiment of the present invention.

Next, a sixth embodiment of the present invention is described with reference to FIG. 7. In the embodiment illustrated in FIG. 7, the source memory and the destination memory are both formed of an addressable memory. An source selection circuit 74 includes an address register for a source memory 71 and serves as a memory access circuit. An source memory designation field 78 in a transfer control table 77 contains information indicative of an address in the source memory 71.

A destination selection circuit 76 includes an address register for a destination memory 72 and serves as a memory access circuit. The transfer control table 77 contains a destination memory designation field 711 in which information indicative of an address In the destination memory 72 is contained. Other components are similar to those described in the fifth embodiment with reference to FIG. 6.

Next, operation of the sixth embodiment is described in detail with reference to FIG. 7. First, the same operational procedures as those described in conjunction with FIG. 5 are repeated to read the source word data out of the source memory 71. By a transfer bit operation circuit 75, masking and shifting operations are performed to transfer the shifted valid word data to the destination selection circuit 76. Next, the destination selection circuit 76 extracts the bit string indicated by destination memory designation data 711 from the transfer control table 77. The destination selection circuit 76 then generates a write address for the destination memory 72 according to the destination memory designation data 711 to transfer the shifted valid word data to the designation memory 72. The above procedures are repeated when two or more pieces of transfer control information are defined in the transfer control table 77.

What is claimed is:

1. A data transfer control system comprising:

a source memory on which source word data are stored;

a transfer control table having a source memory designation field, a desired region designation field, a shifting amount designation field, and a destination memory designation field;

a source selection circuit which causes source designation word data to be read from the source word data stored on the source memory according to source memory designation data contained in the source memory designation field and provides the source designation word data to a transfer data bit operation circuit;

a transfer data bit operation circuit that receives the source designation word data, extracts from the source designation word data only word data required for transfer as valid word data according to desired region designation data contained in the desired region designation field, shifts the valid word data according to shifting amount designation data contained in the shifting amount designation field, and provides the shifted valid word data to a destination selection circuit;

a destination selection circuit that receives the shifted valid word data, selects a destination region for storing the shifted valid word data according to destination memory designation data contained in the destination memory designation field, and provides the shifted valid word data to a destination memory; and a destination memory which receives and stores the shifted valid word data in the destination region.

2. A data transfer control system as claimed in claim 1, wherein the transfer data bit operation circuit extracts only the valid word data according to the desired region designation data by masking invalid word data out of the source designation word data.

3. A data transfer control system as claimed in claim 1 or 2, wherein the shifting amount designation data are formed of shift direction designation data and shift bit width designation data, the shift direction designation data being for designating a direction in which the valid word data are to be shifted and the shift bit width designation data being for designating a bit width by which amount the valid word data are shifted.

4. A data transfer control system as claimed in claim 1, wherein the source memory includes an addressable memory and the source selection circuit includes a memory access circuit, the memory access circuit causing the source designation word data to be read from the source word data stored on the addressable memory according to a read address contained in the source memory designation field.

5. A data transfer control system as claimed in claim 1, wherein the source memory includes N number of registers (where N is a natural number equal to or larger than 2) and the source selection circuit includes a selector circuit, the selector circuit reading the source designation word data stored on the register selected according to selection control data contained in the source memory designation field.

6. A data transfer control system as claimed in claim 1, wherein the destination memory includes an addressable memory and the destination selection circuit includes a memory access circuit, the memory access circuit providing the shifted valid word data to the addressable memory according to a write address contained in the destination memory designation field.

7. A data transfer control system as claimed in claim 1, wherein the destination memory includes N number of registers (where N is a natural number equal to or larger than 2) and the destination selection circuit includes a selector circuit, the selector circuit providing the shifted valid word data to the register selected according to selection control data contained in the destination memory designation field.

8. A data transfer control system as claimed in claim 1, wherein the transfer control table comprises a logical or physical combination of two or more transfer control tables to allow different transfer controls.

9. A data transfer control system comprising:

a source memory on which source word data are stored;

a transfer control table having a source memory designation field and a desired region designation field;

a source selection circuit which causes source designation word data to be read from the source word data stored on the source memory according to source memory designation data contained in the source memory designation field and provides the source designation word data to a transfer data bit operation circuit;

a transfer data bit operation circuit that receives the source designation word data, extracts from the source designation word data only word data required for transfer as valid word data according to desired region designation data contained in the desired region designation field, automatically right-shifts the valid word data such that the least significant bit of the valid word data occupies the same bit position as the least significant bit of the whole source designation word data, and provides the shifted valid word data to a destination selection circuit;

a destination selection circuit that automatically selects a destination region for the shifted valid word data according to a correspondence between a line number of the transfer control table and the destination region, and provides the shifted valid word data to a destination memory; and a destination memory which receives and stores the shifted valid word data in the destination region.

10. A data transfer control system as claimed in claim 9, wherein the transfer data bit operation circuit extracts valid word data according to the desired region designation data by masking invalid word data out of the source designation word data.

11. A data transfer control system as claimed in claim 9, wherein the source memory includes an addressable memory and the source selection circuit includes a memory access circuit, the memory access circuit causing the source designation word data to be read from the source word data stored on the source memory according to a read address in the source memory designation field.

12. A data transfer control system as claimed in claim 9, wherein the source memory includes N number of registers (where N is a natural number equal to or larger than 2) and the source selection circuit includes a selector circuit, the selector circuit reading the source designation word data stored on the register selected according to selection control data contained in the source memory designation field.

13. A data transfer control system as claimed in claim 9 or 10, wherein the destination memory includes an addressable memory and the destination selection circuit includes a memory access circuit, the memory access circuit providing the shifted valid word data to the addressable memory according to the line number of the transfer control table.

14. A data transfer control system as claimed in claim 9, wherein the transfer control table comprises a logical or physical combination of two or more transfer control tables to allow different transfer controls.

15. A data transfer control system as claimed in claim 9, wherein the destination memory includes N number of registers (where N is a natural number equal to or larger than 2) and the destination selection circuit includes a selector circuit, the selector circuit providing the shifted valid word data to the register selected according to the line number of the transfer control table.

* * * * *